United States Patent [19]

Moon

[11] Patent Number: 5,588,664
[45] Date of Patent: Dec. 31, 1996

[54] LINK DEVICE OF A LATERAL ROD FOR A VEHICLE

[75] Inventor: Tae J. Moon, Yangsan-kun, Rep. of Korea

[73] Assignee: Hyundai Motor Company, Ltd., Seoul, Rep. of Korea

[21] Appl. No.: 581,426

[22] Filed: Dec. 29, 1995

[51] Int. Cl.⁶ .................................................. B60G 11/20
[52] U.S. Cl. ............................................ 280/689; 280/723
[58] Field of Search .................................. 280/689, 723, 280/688, 717; 267/273, 285

[56] References Cited

U.S. PATENT DOCUMENTS

| | | | |
|---|---|---|---|
| 3,315,952 | 4/1967 | Vittone | 280/689 |
| 4,854,766 | 8/1989 | Hein | 280/689 X |
| 5,102,160 | 4/1992 | Stowe | 280/723 X |
| 5,456,486 | 10/1995 | Lee | 280/689 |

FOREIGN PATENT DOCUMENTS

| | | | |
|---|---|---|---|
| 0101210 | 4/1989 | Japan | 280/689 |
| 3-82614 | 6/1991 | Japan . | |

*Primary Examiner*—Christopher P. Ellis
*Attorney, Agent, or Firm*—Birch, Stewart, Kolasch & Birch, LLP

[57] ABSTRACT

A link device of a lateral rod for a vehicle includes a bracket fixed to a rear axle of the vehicle, an inner pipe attached to the bracket by a mounting bolt and having a cam-shaped raised portion extending therefrom, an outer socket extended from the lateral rod and having a pair of protruding portions extending therefrom, a buffer member positioned within a space between the inner pipe and the outer socket, whereby the link device can effectively prevent from changing position balance between the rear axle and the frame of the vehicle so as to highly increase safe handling activity for a vehicle.

3 Claims, 2 Drawing Sheets

5,588,664

LINK DEVICE OF A LATERAL ROD FOR A VEHICLE

BACKGROUND OF THE INVENTION

1. Field of the Invention

The present invention relates to an improved link device of a lateral rod for a vehicle and more particularly, to a link device having a cam-shaped bush for attaching a lateral rod to a rear axle to effectively rotate the lateral rod with respect to the rear axle whereby the link device can prevent a changing position balance between the auto frame and rear axle.

2. Description of Related Art

Various types of link devices of a lateral rod for a vehicle are known in the art. Generally, most link devices of a lateral rod are disposed between the auto frame 2 and the rear axle 1 so as to control right and left directional movement of the autobody.

Laid Open Japanese Patent Publication No. 3-82614 discloses a suspension system including upper and lower arms for enabling free up and down movement of the vehicle wheels, a strut disposed between the upper and lower arms, and an autobody side bushing for enabling movement of the suspension system about the auto frame, the autobody side bushing having a small size about other portion of a diagonal based on a horizontal lateral and a vertical line about the horizontal lateral.

As shown in FIGS. 1, 2, and 3, one such conventional link device 10 of a lateral rod 5 includes a bracket 6 fixed to a rear axle 1 and an inner pipe 3 and an outer socket 4 attached thereto by using a mounting bolt 7. That is, the inner pipe 3 is inserted into the outer socket 4, and the inner pipe 3 and the outer socket 4 are connected to each other by fixing to the bracket 6 through the mounting bolt 7. A lateral rod 5 is attached to the outer surface of the outer socket 4 and a buffer member 8 is located between the inner pipe 3 and the outer socket 4 (FIG. 3).

Such a conventional link device 10 operates as follows. When the autobody turns in the right and left or in the U-turn direction, or rides over the raised portion of the road such as a bump, the link device 10 moves up and down in the arc direction as shown in a dotted line of FIG. 1. At this time, usually the autobody (not shown) and the rear axle 1 change position balance in the vertical direction. Therefore, the conventional link device 10 can reduce handling efficiency of a vehicle.

SUMMARY OF THE INVENTION

Accordingly, it is an object of the present invention to provide an improved link device of a lateral rod for a vehicle, which eliminates the above problems encountered with conventional link devices of a lateral rod for a vehicle.

Another object of the present invention is to provide a link device of a lateral rod for a vehicle, which includes an inner pipe having a cam-shaped raised portion, and an outer socket having a pair of upper and lower protruding portions for matching with the cam-shaped raised portion when the vehicle rides over a bump and turns in any direction, so that the link device can substantially increase handling efficiency by preventing a position balance change of the autobody and the rear axle.

A further object of the present invention is to provide a link device of a lateral rod, which is simple in structure, inexpensive to manufacture, durable in use, and refined in appearance.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a link device of a lateral rod for a vehicle, which includes a bracket fixed to a rear axle of the vehicle, an inner pipe attached to the bracket by a mounting bolt and having a cam-shaped raised portion extending therefrom, an outer socket extended from the lateral rod and having a pair of protruding portions extending therefrom, and a buffer member positioned within a space between the inner pipe and the outer socket, whereby the link device can effectively prevent a changing position balance between the rear axle and the auto frame of the vehicle so as to highly increase safe handling activity for vehicle.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
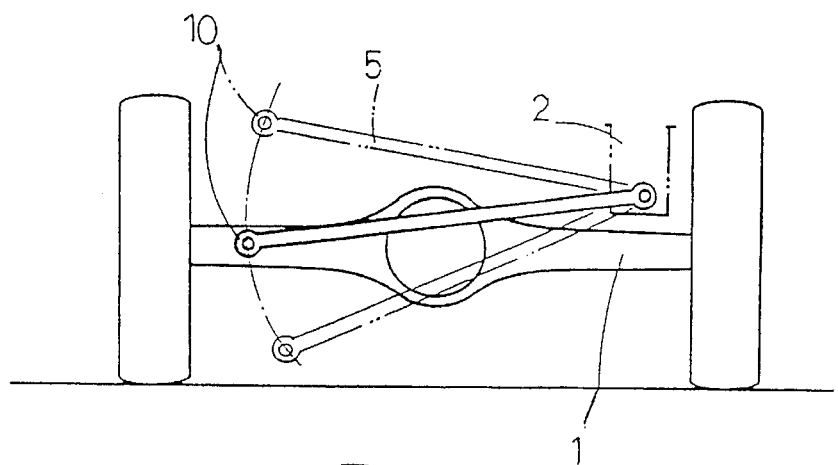
FIG. 1 is a partially diagrammatic side view of a conventional lateral rod mounted to a rear axle of a vehicle in an operational state.
Figure 2:
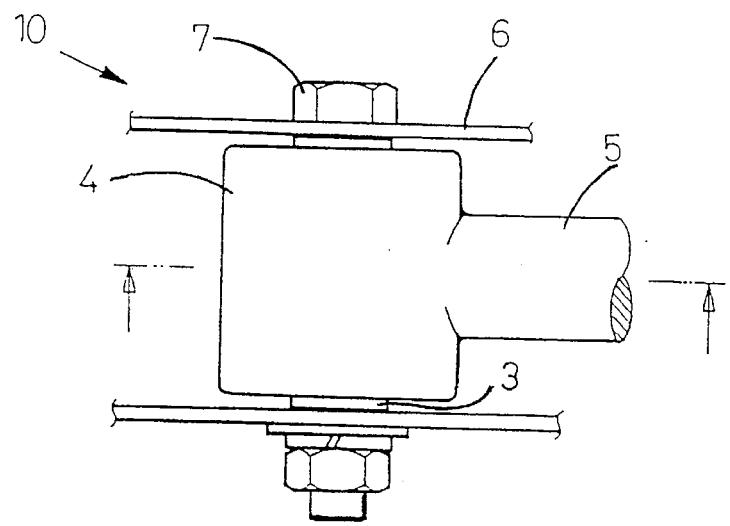
FIG. 2 is a top plan view of a bushing of the conventional lateral rod mounted to a rear axle of a vehicle.
Figure 3:
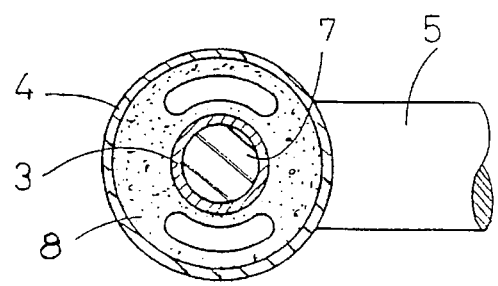
FIG. 3 is a front elevational view of the bushing of the conventional lateral rod mounted to a rear axle of a vehicle.
Figure 4:
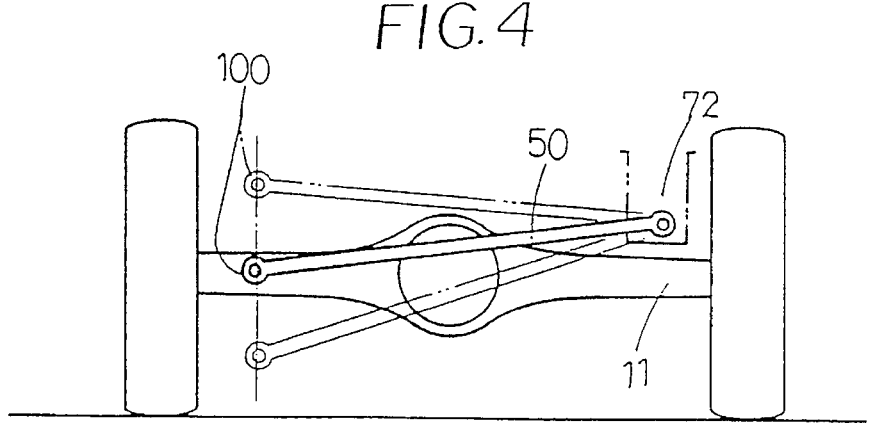
FIG. 4 is a partially diagrammatic side view of a link device of a lateral rod mounted to a rear axle of a vehicle in an operational state according to the present invention.
Figure 5:
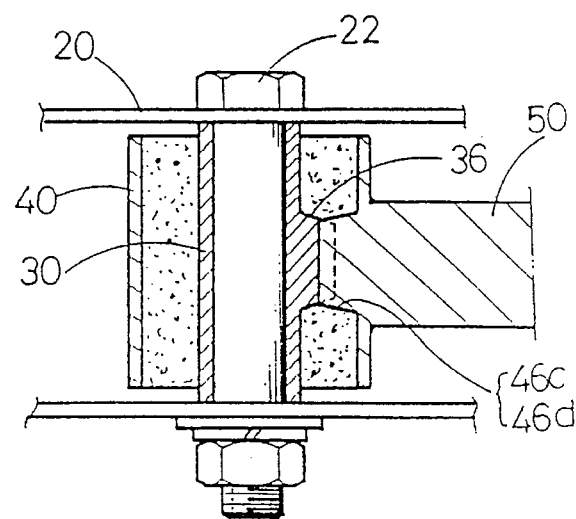
FIG. 5 is a top plan view of a bushing of the link device of the lateral rod mounted to a rear axle of a vehicle showing cut-away in order to illustrate the construction of a basic structure according to the present invention.
Figure 6:
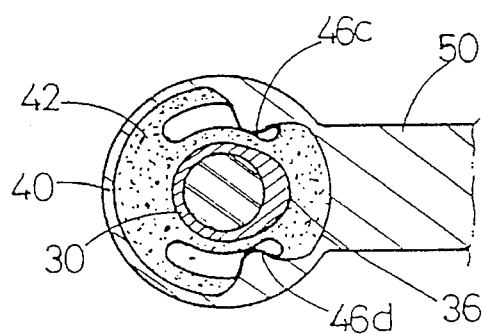
FIG. 6 is a cross-sectional view of the bushing of the link device of the lateral rod mounted to a rear axle of a vehicle according to the present invention.

Referring now in detail to the drawings for the purpose of illustrating preferred embodiments of the present invention, the link device of a lateral rod for a vehicle as shown in FIGS. 4, 5, and 6 is provided with a lateral rod 50 rotatably mounted to both a rear axle 11 and an auto frame 72 of the vehicle. The lateral rod 50 is provided on at least one end thereof with the link device 100.

The link device 100 contains a bracket 20 fixed to the rear axle 11, the bracket 20 provided with an inner pipe 30 attached thereto and an outer socket 40 for receiving the inner pipe 30, a mounting bolt 22 for attaching the inner pipe 30 and outer socket 40 to the bracket 20 as a kind of hinge, and a buffer member 42 disposed between the inner pipe 30 and the outer socket 40 for preventing impact and conflict therebetween.

Figure 7:
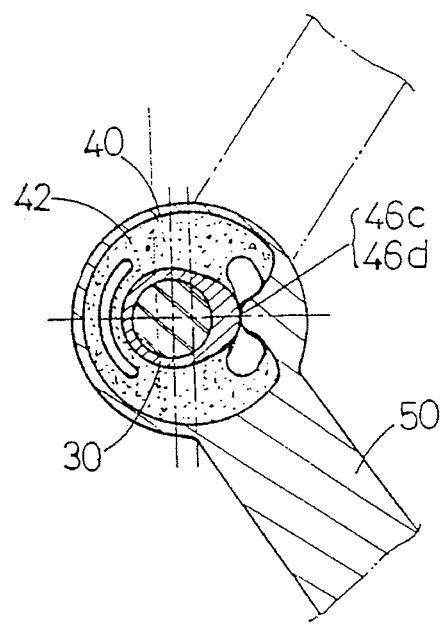
FIG. 7 is a cross-sectional view of the bushing of the link device of the lateral rod mounted to a rear axle of a vehicle in an operational state according to the present invention.

As shown in FIGS. 6 and 7, the inner pipe 30 is provided with a cam-shaped raised portion 36 extending therefrom in the vertical direction, and the outer socket 40 is provided with a pair of upper and lower protruding portions 46c and 46d extending therefrom in the vertical directions for matching with the cam-shaped portion 36 when the vehicle rides over a bump and turns in any direction.

The link device 100 according to the present invention operates as follows. When the vehicle rides over a raised portion on the road such as a bump, turns in any direction, and rebounds, and the lateral rod 50 moves to position "a" (FIG. 4), the cam-shaped raised portion 36 of the inner pipe 30 contacts with the upper protruding portion 46c for extending the distance of both ends of the lateral rod 50 so as to move the rod up perpendicularly.

In turn, when the lateral rod 50 moves to position "b" (FIG. 4), the cam-shaped raised portion 36 of the inner pipe 30 contacts with the lower protruding portion 46d for extending the distance of both ends of the lateral rod 50 so as to move the rod down perpendicularly. Thus, when the lateral rod 50 moves up and down to the "a" and "b" positions, the inner pipe 30 moves toward the left direction from the original central axis thereof, so that the link device 100 only moves up and down perpendicularly.

Accordingly, the link device 100 according to the present invention can effectively prevent a changing position balance between the rear axle and the auto frame of the vehicle when the vehicle turns in the left, right, or U-turn direction, or rides over the raised portion on the ground such as a kind of a bump. The distance between both ends of the lateral rod 50 extends due to the inner pipe 30 moving to the left side from the original central axis thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A link device of a lateral rod for a vehicle, comprising:

a bracket fixed to a rear axle of said vehicle;

an inner pipe attached to said bracket by a mounting bolt, said inner pipe having a raised portion extending from one side thereof;

an outer socket extending from one end of said lateral rod, said outer socket having a pair of upper and lower protruding portions wherein said upper and lower protruding portions extend from upper and lower portions thereof, and said outer socket surrounding said inner pipe for forming a ring-shaped space therebetween; and a buffer member disposed within the ring shaped space between said inner pipe and said outer socket, whereby when the vehicle turns in any direction and rides over a bump, one of the protruding portions rotates into engagement with the raised portion of said inner pipe, thereby extending a vertical displacement of said lateral rod.

2. The link device of claim 1, wherein said raised portion of the inner pipe has a cam-shaped configuration for effectively matching with the pair of upper and lower portions of the outer socket.

3. The link device of claim 1, wherein said mounting bolt is a hinge.

* * * * *